United States Patent
Carlson, Jr. et al.

(10) Patent No.: US 7,200,997 B2
(45) Date of Patent: Apr. 10, 2007

(54) WATER AUGMENTED REGENERATION (WAR) TURBINE SYSTEM AND CYCLE

(75) Inventors: Charles A. Carlson, Jr., Chuluota, FL (US); Francisco Dovali-Solis, Orlando, FL (US); Adam Plant, Orlando, FL (US)

(73) Assignee: Siemens Power Generation, Inc., Orlando, FL (US)

(*) Notice: Subject to any disclaimer, the term of this patent is extended or adjusted under 35 U.S.C. 154(b) by 123 days.

(21) Appl. No.: 10/928,523

(22) Filed: Aug. 27, 2004

(65) Prior Publication Data

US 2005/0172635 A1 Aug. 11, 2005

Related U.S. Application Data

(60) Provisional application No. 60/542,939, filed on Feb. 9, 2004.

(51) Int. Cl.
*F02C 3/30* (2006.01)
(52) U.S. Cl. ............... 60/775; 60/39.55; 60/39.59
(58) Field of Classification Search .......... 60/775, 60/39.17, 39.54, 39.59, 39.511, 39.55
See application file for complete search history.

(56) References Cited

U.S. PATENT DOCUMENTS

| | | | |
|---|---|---|---|
| 6,141,955 A * | 11/2000 | Akiyama et al. | 60/39.15 |
| 6,247,302 B1 * | 6/2001 | Tsukamoto et al. | 60/39.511 |
| 6,397,578 B2 * | 6/2002 | Tsukamoto et al. | 60/39.511 |
| 6,578,354 B2 * | 6/2003 | Hatamiya et al. | 60/39.511 |
| 6,644,013 B1 * | 11/2003 | Hatamiya et al. | 60/39.511 |
| 6,877,320 B2 * | 4/2005 | Linder | 60/775 |

* cited by examiner

Primary Examiner—William H. Rodriguez (57) ABSTRACT

A gas turbine system (100) includes a compressor (110) for receiving air and producing compressor discharge air, a combustor (120) for combusting an oxygen comprising gas flow including the discharge air and a fuel into a hot gas flow, and a turbine expander (130) generating output power from the hot gas flow and providing a hot exhaust gas flow. An extractor (135) is provided for splitting the discharge air into a direct flow portion (121) which directly reaches the combustor (120) and an indirect flow portion (122). A mixing device (140) receives the indirect flow portion (122) and mixes it with a water flow (145), either in the form of water or steam, to produce a water enhanced indirect flow portion (150). A recuperative heat exchanger (155) heats the water enhanced indirect flow portion (150) using heat from at least a portion of the hot exhaust gas flow. The heated water enhanced indirect flow portion (158) is then reintroduced into the oxygen comprising gas flow.

6 Claims, 6 Drawing Sheets

| Parameter | Units | Baseline Dry | Baseline Wet Compression | Hypothetical Case with Increased WC Flow and No Recuperation | Invention |
|---|---|---|---|---|---|
| Frame | -- | W501D5A | W501D5A | W501D5A | W501D5A |
| Configuration | -- | Simple Cycle | Simple Cycle | Simple Cycle | Simple Cycle |
| Combustion System | -- | DLN | DLN | DLN | DLN |
| Load | -- | Base | Base | Base | Base |
| Fuel | -- | Natural Gas | Natural Gas | Natural Gas | Natural Gas |
| LHV | Btu/$lb_m$ | 20,981 | 20,981 | 20,981 | 20,981 |
| Ambient Temperature | F | 80 | 80 | 80 | 80 |
| Barometric Pressure | psia | 14.696 | 14.696 | 14.696 | 14.696 |
| Relative Humidity | % | 60 | 60 | 60 | 60 |
| Injection | -- | None | None | None | None |
| Injection Flow Rate | $lb_m$/hr | -- | -- | -- | -- |
| Wet Compression Flow Rate | GPM | -- | 80 | 110 | 110 |
| Gross Power | MW | 111.73 | 125.44 | 130.03 | 125.97 |
| Gross Heat Rate [LHV] | Btu/kW-hr | 9,995 | 9,725 | 9,645 | 9,150 |
| Exhaust Temperature | F | 1007 | 1006 | 1008 | 918 |
| Exhaust Flow | $lb_m$/hr | 2,921,680 | 2,992,267 | 3,008,917 | 3,004,031 |
| Fuel Flow | $lb_m$/hr | 53,210 | 58,146 | 59,781 | 54,896 |
| Shell Pressure | psia | 212.3 | 218.9 | 220.7 | 220.7 |
| Compressor Discharge Temperature | F | 769.1 | 689.9 | 659.9 | 659.9 |
| Combustor Inlet Temperature | F | 769.1 | 689.9 | 659.9 | 805.0 |
| Compressor Inlet Air Flow | $lb_m$/hr | 2868443.9 | 2898000.0 | 2898000.0 | 2898000.0 |
| Compressor Discharge Flow (available for recuperation) | | -- | -- | -- | 2517840.0 |
| Recuperation Flow | $lb_m$/hr | -- | -- | -- | 1,197,014 |
| % Recuperation (based on available compressor discharge flow) | % | -- | -- | -- | 50% |

FIG. 6

WATER AUGMENTED REGENERATION (WAR) TURBINE SYSTEM AND CYCLE

CROSS-REFERENCE TO RELATED APPLICATIONS

This application claims the benefit of Provisional Patent Application No. 60/542,939 filed on Feb. 9, 2004, which is hereby incorporated by reference in its entirety into the current application.

FIELD OF THE INVENTION

The invention relates to gas turbines, and more specifically to turbines utilizing water augmented regeneration cycles.

BACKGROUND OF THE INVENTION

Gas turbines are used in a variety of applications. Gas turbines have a compressor section for compressing inlet air, a combustion section for combining the compressed inlet air with fuel and oxidizing that fuel, and a turbine section where the energy from the hot gas produced by the oxidation of the fuel is converted into work. Usually, natural gas (mostly methane), kerosene, or synthetic gas (such as carbon monoxide) is fed as fuel to the combustion section, but other fuels could be used. The rotor, defined by a rotor shaft, attached turbine section rotor blades, and attached compressor section rotor blades, mechanically powers the compressor section and, in some cases, a compressor used in a chemical process or an electric generator. The exhaust gas from the turbine section can be used to achieve thrust or used as a source of heat and energy. In some cases, the exhaust gas is simply discarded.

Water injection or steam injection within the combustion chamber is a technology to reduce or limit thermal NOx formation by reducing the combustion turbine flame temperature. Water added at the compressor inlet when the gas turbine is operating under full load also augments the power output capability of a gas turbine above the output achievable with normally humidified air. Such an arrangement is referred to as "wet compression," such as disclosed in U.S. Pat. No. 4,841,721 to Patton et al. Wet compression enables power augmentation in gas turbine systems by reducing the work required for compression of the inlet air. This thermodynamic benefit is realized within the compressor of a gas turbine through latent heat intercooling, in which water (or some other appropriate liquid) is added to the air inducted into the compressor and cools that air, through evaporation, as the air with the added water droplets are being compressed.

Additional fuel flow is generally required to raise the temperature of the cooled air/steam mixture discharged from the compressor to the firing temperature of the gas turbine as compared to otherwise equivalent dry air compression. However, a decrease in compressor discharge air temperature can result in a destabilization of the combustion flame. Combustion stabilization can be achieved by retuning the combustion system, however this typically results in increased NOx emissions. What is needed is a method for combustion stabilization for wet compression applications that does not increase NOx emissions.

SUMMARY

A gas turbine system includes a compressor for receiving air and producing compressor discharge air, a combustor for combusting an oxygen comprising gas flow including the discharge air and a fuel into a hot gas flow, and a turbine expander generating output power from the hot gas flow and providing a hot exhaust gas flow. An extractor is provided for splitting the discharge air into a direct flow portion which directly reaches the combustor and an indirect flow portion. A mixing device receives the indirect flow portion and mixes it with a water flow, either in the form of water or steam, to produce a water enhanced indirect flow portion having an enhanced motive force. A recuperative heat exchanger heats the water enhanced indirect flow portion using heat from at least a portion of the hot exhaust gas flow. The heated water enhanced indirect flow portion is then reintroduced into the oxygen comprising gas flow. The system provides a substantial heat rate improvement over both a dry system or a wet compression system.

The mixing device can comprise a water or stem driven venturii ejector. The system can also include a water pump, where the water pump is fluidly connected to an inlet of the compressor. The water pump injects water into the inlet of the compressor for wet compression. A heat exchanger can be disposed between the water pump and the mixing device for heating the water. The water flow can be a steam flow.

A gas turbine system having water augmented regeneration comprises a compressor for receiving air and producing compressor discharge air, a combustor for combusting an oxygen comprising gas flow including the discharge air and a fuel into a hot gas flow, and a turbine expander generating output power from the hot gas flow and providing a hot exhaust gas flow. An extractor splits the discharge air into a direct flow portion routed directly to the combustor and an indirect flow portion. A water pump is fluidly connected to an inlet of the compressor, the water pump injecting water into the inlet of the compressor for wet compression. An auxiliary pump boosts a pressure of the indirect flow portion to provide a pressure enhanced indirect flow portion. A heat exchanger heats the pressure enhanced indirect flow portion using heat from at least a portion of the hot exhaust gas flow, where the pressure enhanced indirect flow portion after heating by the heat exchanger is reintroduced into the oxygen comprising gas flow.

A method of operating a gas turbine system including a compressor for receiving air and producing compressor discharge air, a combustor for combusting an oxygen comprising gas flow including the discharge air and a fuel into a hot gas flow, and a turbine expander generating output power from the hot gas flow and providing a hot exhaust gas flow, comprises the step of splitting the discharge air into a direct flow portion and an indirect flow portion. The direct flow portion is routed directly to the combustor. The indirect flow portion is mixed with a water flow to provide a water enhanced indirect flow portion. The water enhanced indirect flow portion is heated using heat from at least a portion of the hot exhaust gas flow. The water enhanced indirect flow portion is then reintroduced after heating into the oxygen comprising gas flow.

The mixing step can utilize a water or steam driven venturii ejector. The method can include the step of injecting water droplets into an inlet of the compressor to implement wet compression.

BRIEF DESCRIPTION OF THE DRAWINGS

A fuller understanding of the present invention and the features and benefits thereof will be obtained upon review of the following detailed description together with the accompanying drawings, in which.

DETAILED DESCRIPTION

A water augmented regeneration (WAR) turbine system and cycle described herein is a gas turbine (GT) regeneration cycle operated in conjunction with water augmentation. A gas turbine system includes a compressor for receiving air and producing compressor discharge air, a combustor for combusting an oxygen comprising gas flow, including the discharge air and a fuel, into a hot gas flow, and a turbine expander generating output power from the hot gas flow and providing a hot exhaust gas flow. An extractor is provided for splitting the discharge air into a direct flow portion which directly reaches the combustor, and an indirect flow portion. A mixing device receives the indirect flow portion and mixes it with a water flow, either in the form of water or steam, to produce a water enhanced indirect flow portion. A recuperative heat exchanger heats the water enhanced indirect flow portion using heat from at least a portion of the hot exhaust gas flow. The heated water enhanced indirect flow portion is then reintroduced into the oxygen comprising gas flow. In one embodiment, rather than using a mixing device that relies on water or steam as the motive force to drive the indirect flow portion, a booster pump is used.

Depending on the limitations of the system, water may be injected as wet compression into the compressor inlet and/or it may be injected directly into the bypassed compressor discharge air. The WAR cycle increases combustor shell temperatures for improved heat rate and more stable combustor dynamics without a corresponding decrease in power by generally utilizing waste heat from the exhaust to increase the combustor shell temperature while increasing the power output by maximizing the amount of water injected into the system. The invention thus provides systems and methods for stabilization of the flame for wet compression gas turbine applications.

Several exemplary cycle configurations according to the invention are described herein. In a typical configuration, the system bypasses part of the compressor discharge flow to a recuperative heat exchanger in the exhaust of the gas turbine (GT) and then re-injects the flow back into the combustor shell. The pressure loss through the system is preferably compensated by a boost device, such as a saturated water driven ejector, a steam driven ejector, or an auxiliary compressor.

Figure 1:
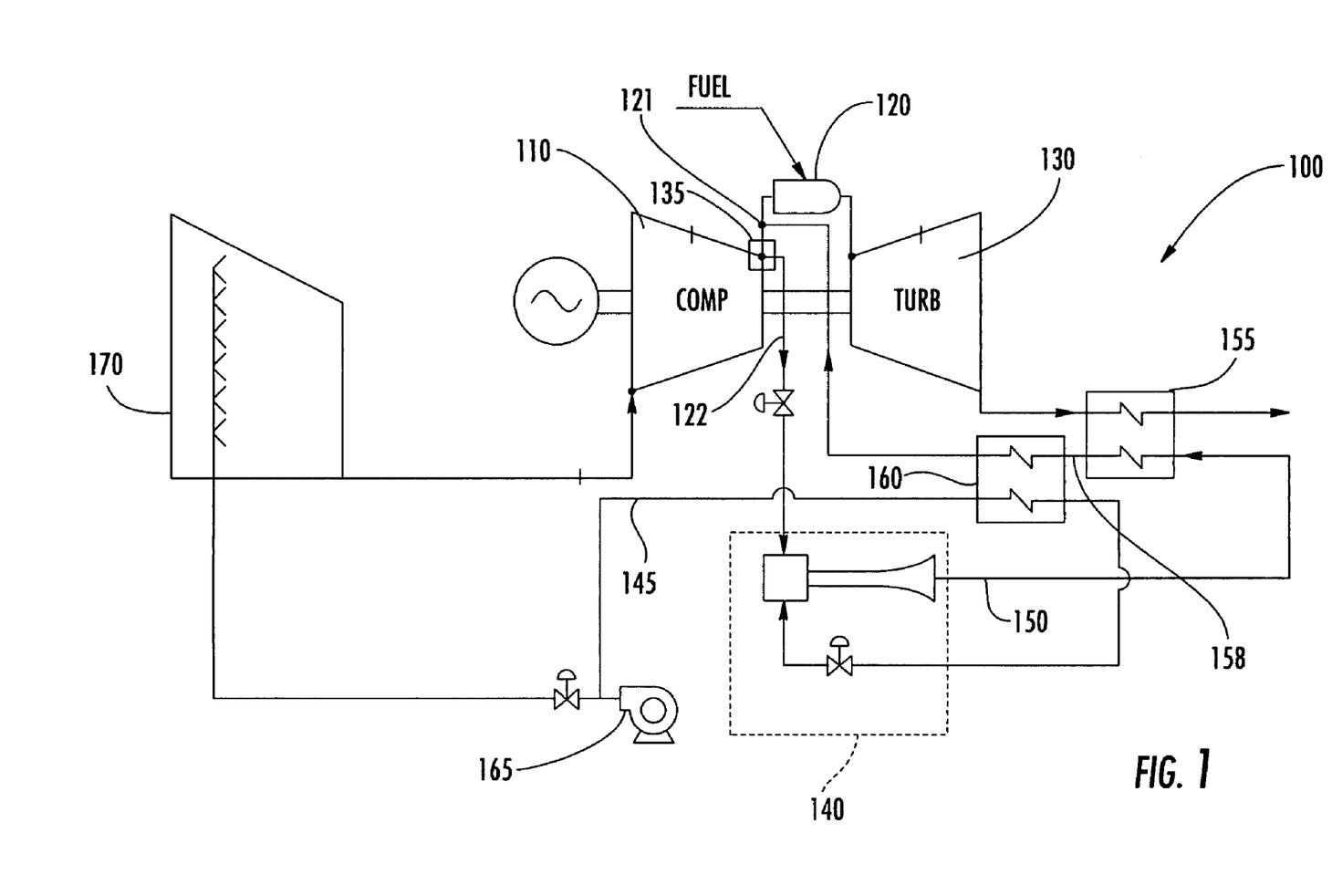
FIG. 1 shows an exemplary water augmented gas turbine system having regeneration in which water is injected into the compressor inlet and compressor discharge air, according to an embodiment of the invention.

FIG. 1 shows a first exemplary water augmented gas turbine system 100. The system 100 includes a compressor 110 which receives air or other oxygen comprising gas and produces compressor discharge air. A combustor 120 combusts an oxygen comprising gas flow including the discharge air and a fuel into a hot gas flow. A turbine expander 130 generates output power from the hot gas flow and provides a hot exhaust gas flow.

An extractor 135 is provided for splitting the compressor discharge air into a direct flow portion 121 which directly reaches the combustor 120 and an indirect flow portion 122. The extractor preferably takes the portion of compressor discharge air off of the compressor discharge casing. The extractor is essentially a passive device, but preferably includes flow control capability. A mixing device 140 receives the indirect flow portion 122 and mixes it with a water (or steam) flow 145, to produce a water enhanced indirect flow portion 150. The pipe carrying indirect flow portion 122 and the mixing device 140 regulates both the extraction and water flow rates to the desired amount. The system should be properly sized to operate from a "no-flow" condition to a maximum allowable flow within given gas turbine and plant limitations.

The mixing device 140 is preferably embodied as a water driven venturii ejector which utilizes high pressure water, having a pressure such as 1000 to 1500 psi, injected at saturation temperature (~590 F) as the motive force for the bypassed indirect flow portion 122. Increased air pressure results from the water flashing to the much lower pressure (~200 psi) of the bypassed indirect flow portion air 122 as it exits the mixing device 140 (e.g. ejector). This design has the added benefit of increased power due to the additional mass flow of the water that is introduced to the system 100.

The system 100 includes a first heat exchanger 155 and a second heat exchanger 160. The first heat exchanger 155 heats the water enhanced indirect flow portion 150 using heat from the hot exhaust gas flow produced by the turbine 130. The heated water enhanced indirect flow portion 158 optionally transfers some heat to the water flow 145 at the second heat exchanger 160 before being combined with the direct flow portion 121.

A water pump 165 pumps water for injection into the inlet of the compressor 110 to implement wet compression and to drive the water flow 145 utilized by mixing device 140. A heat exchanger 170 heats water provided by the water pump 165 before reaching the compressor 110. Thus, the system 100 provides regeneration and water injection into the inlet of the compressor 110 and a portion of the discharge air provided by the compressor 110.

In the system 100, and in an analogous fashion for other systems according to the invention, the compressed air provided by the compressor 110 is thus boosted in pressure to overcome pipe pressure losses before going through the heat exchanger 155 where it is warmed by the relatively hot exhaust gas from the turbine 130. After passing through the heat exchanger 155, the warmed air is recombined with the rest of the compressor discharge air 121, increasing the overall temperature of the air entering the chambers of the combustor 120. Warmer pre-combustion air requires less energy to achieve the desired turbine inlet temperature. Thus, the same turbine power output is maintained with reduced fuel consumption.

Figure 2:
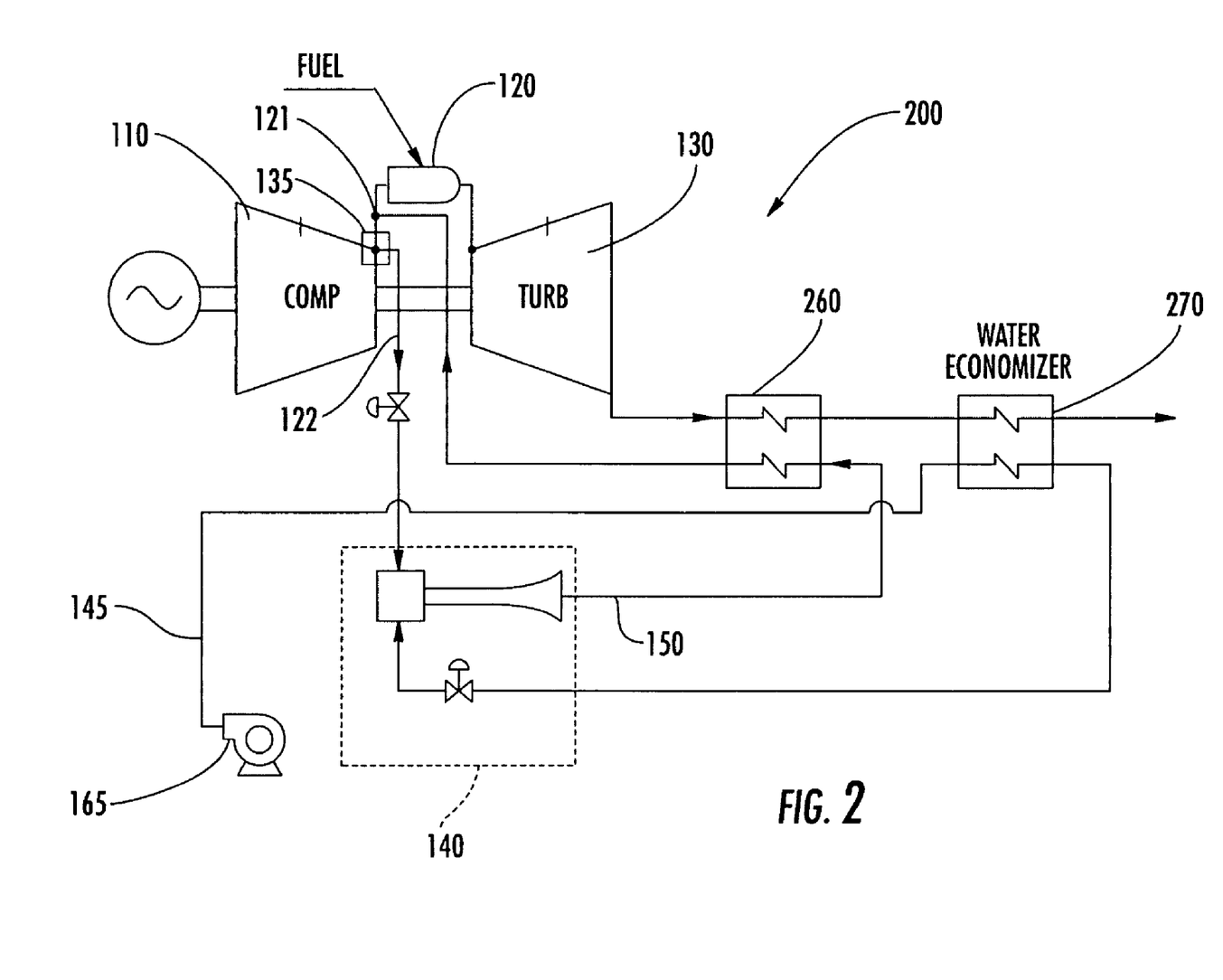
FIG. 2 shows an exemplary water augmented gas turbine system having regeneration in which water is injected into the compressor discharge air, according to another embodiment of the invention.

FIG. 2 shows another exemplary water augmented gas turbine system 200 having regeneration in which water is injected into the compressor discharge air, according to another embodiment of the invention. Like components in FIG. 2, subsequent FIGS. 3–5 include the same reference numbers as shown in FIG. 1. Heat from the hot exhaust gas flow produced by the turbine 130 heats a heat exchanger 260 and a water economizer 270. The heat exchanger 260 heats the water enhanced indirect flow portion 150, while the water economizer 270. EXCHANGER) heats the water flow 145 from the water pump 165 before reaching the mixing device(s) 140, 130. Unlike the system 100 shown in FIG. 1, the system 200 does not inject water into the inlet of the compressor 110.

Figure 3:
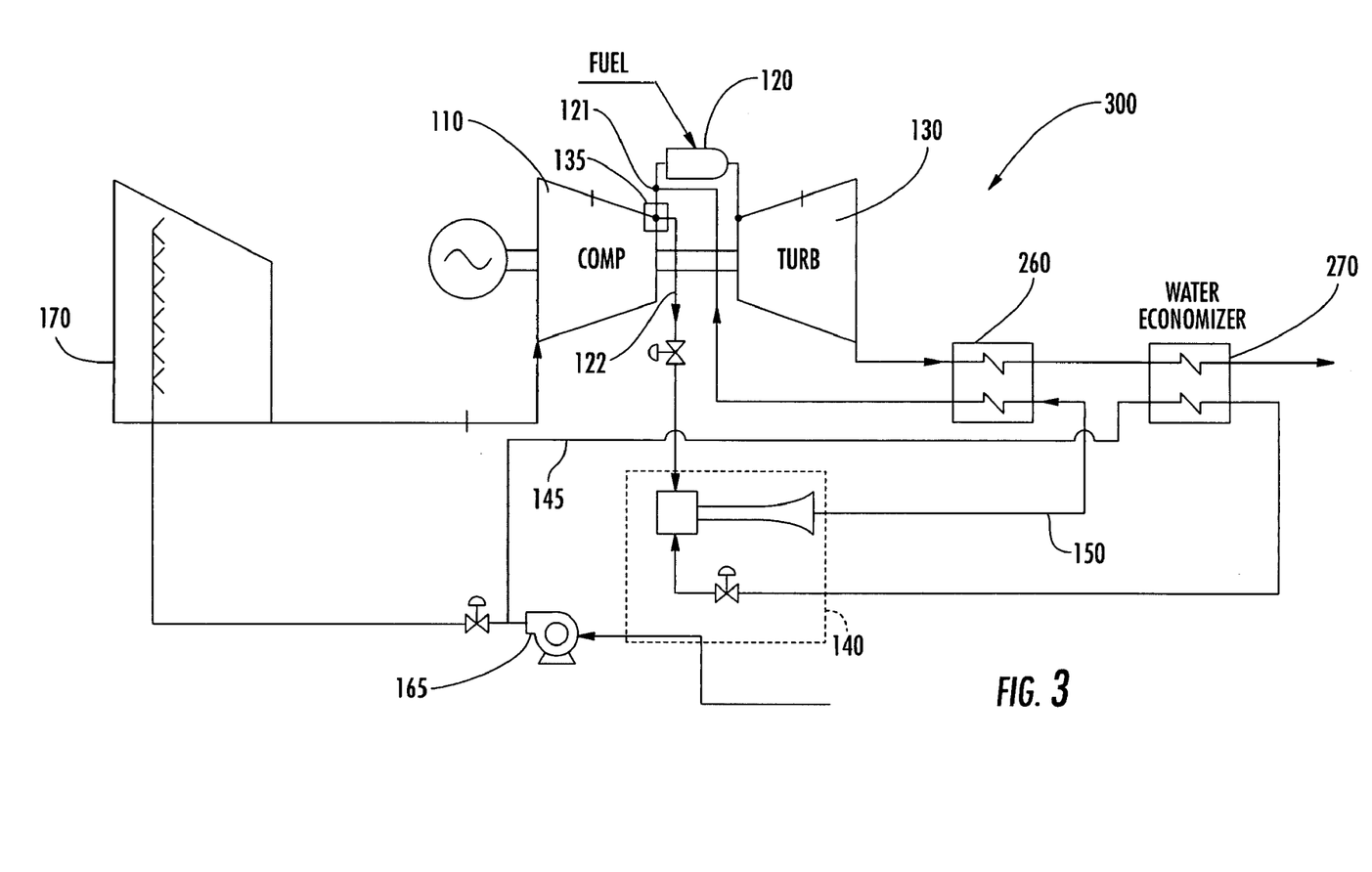
FIG. 3 shows another exemplary water augmented gas turbine system having regeneration in which water is injected into the compressor inlet and compressor discharge air, according to an embodiment of the invention.

FIG. 3 shows another exemplary water augmented gas turbine system 300, according to another embodiment of the invention including regeneration and water injection into inlet of the compressor 110 and the discharge air provided by the compressor 110. The system 300 has an arrangement similar to the system 200 shown in FIG. 2, but includes a heat exchanger 170 to heat water provided by the water pump 165 before reaching the compressor 110 to implement wet compression.

Figure 4:
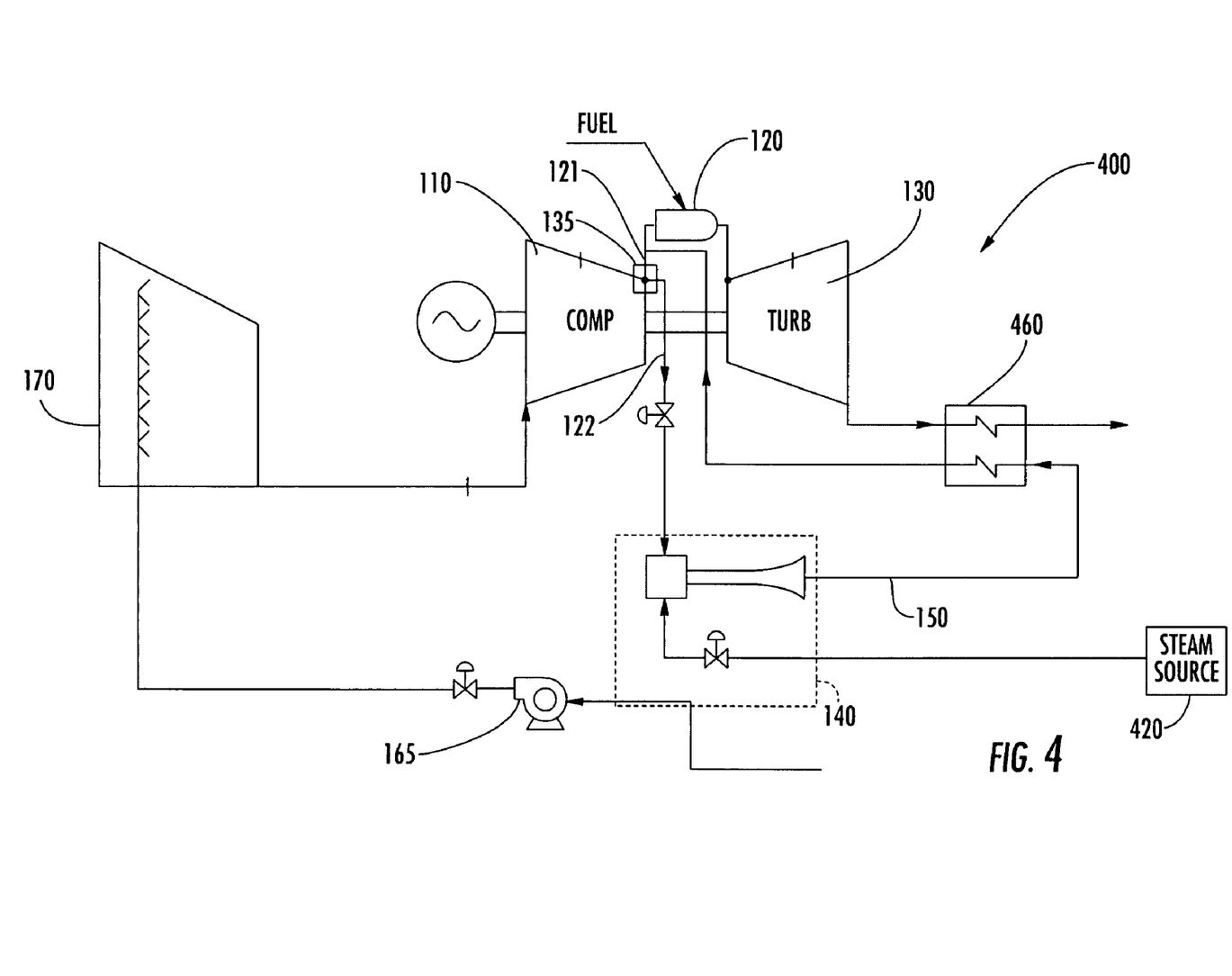
FIG. 4 shows yet another exemplary water augmented gas turbine system having regeneration in which water is injected into the compressor inlet and steam, which is supplied externally, is injected into the compressor discharge air, according to another embodiment of the invention.

FIG. 4 shows yet another exemplary water augmented gas turbine system 400, including regeneration and water injection into inlet of the compressor 110 and the discharge air provided by compressor 110 according to another embodiment of the invention. Instead of relying on heating of the water flow before mixing the water and the indirect flow portion 122 at the mixing device 140, steam is instead supplied from an external steam source 420, such as from a steam cycle.

The mixing device 140 embodied as a steam driven ejector generally utilizes high pressure (~350 psi) steam at superheated temperatures (~600 F) as the motive force for the indirect flow portion 122, and the water enhanced indirect flow portion 150 is heated by a heat exchanger 460 before being combined with the direct flow portion 121. Increased air pressure results from the expansion of the steam to the much lower pressure of the indirect flow portion 122, similar to the water driven ejector described above in connection with the embodiments of FIGS. 1–3. This concept has the drawback that it removes steam from the steam cycle similar to steam power augmentation, although to a much lesser degree. The decreased load is offset, however, by the increased power gained from higher wet compression flow rates, which can generally only be achieved on DLN units if the shell temperature is increased.

Figure 5:
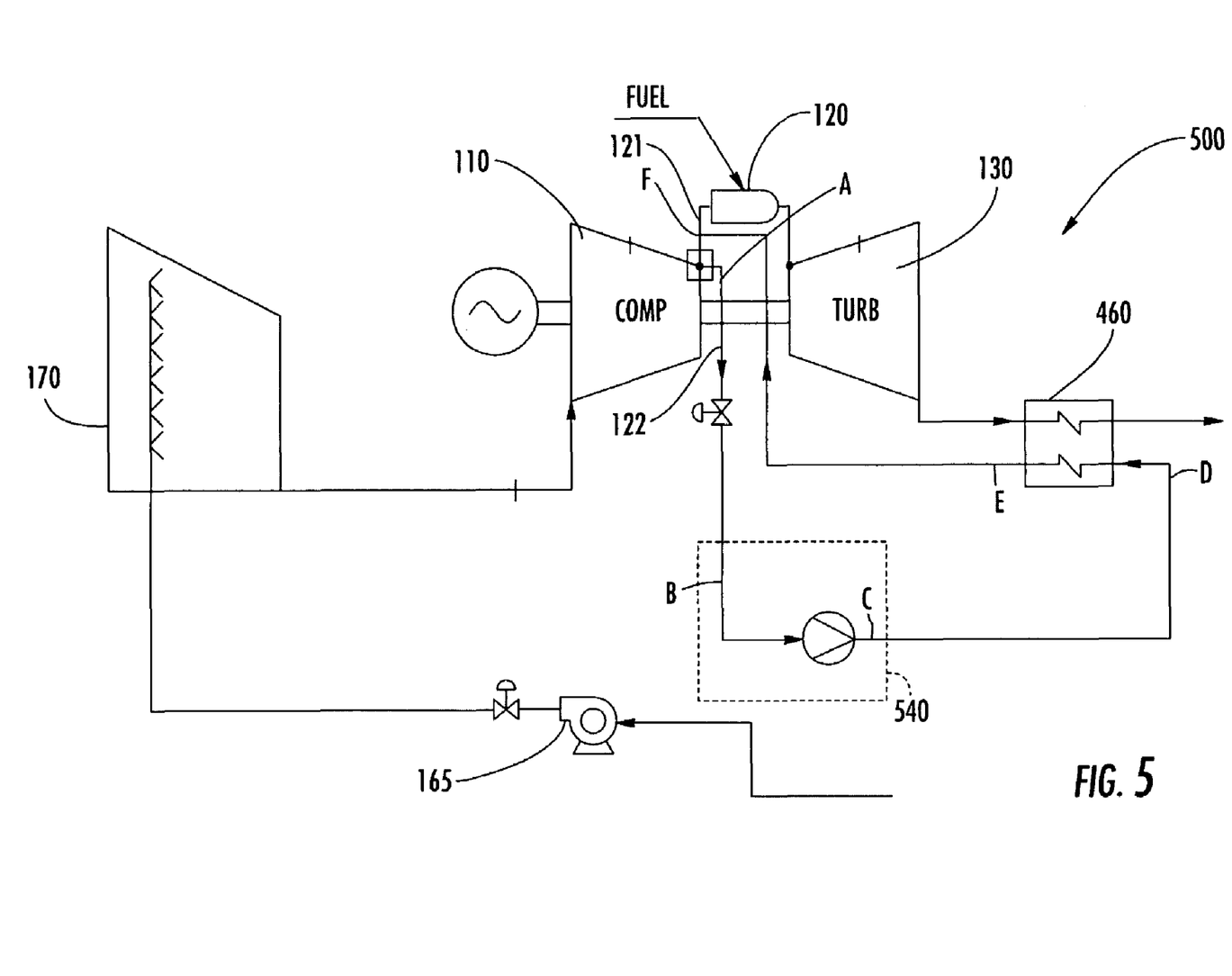
FIG. 5 shows another exemplary water augmented gas turbine system having regeneration in which water is injected into the compressor inlet and a booster pump is provided in the regeneration loop, according to another embodiment of the invention.

FIG. 5 shows another exemplary water augmented gas turbine system 500, including regeneration and water injection into inlet of the compressor 110 and the discharge air provided by the compressor 110, according to another embodiment of the invention. Letters A–F are included for reference only in connection with the Example described below.

Rather than using the mixing device 140, shown in FIGS. 1–4, which relies on water or steam as the motive force to drive the indirect flow portion 122, an auxiliary booster pump 540 is used. This arrangement has an associated auxiliary load required to drive the compression process but that load is offset by the increased power gained from higher wet compression flow rates which can generally only be achieved on DLN units if the shell temperature is increased.

The invention is expected to have a variety of applications. For example, increasing the combustor shell air temperature via the WAR cycle may thus allow for higher wet compression flow rates and more power on dry low NOx (DLN) turbines units. Non-DLN units may also benefit from the improved heat rate and potentially lower emissions. Regeneration provided by systems according to the invention may also reduce emissions and provide performance benefits due to higher shell temperatures.

EXAMPLE

Aspects of the present invention are further illustrated by the following specific example, which should not be construed as limiting the scope or content of the invention in any way.

A thermodynamic analysis was completed to determine the GT performance benefits from application of a WAR cycle according to the invention based on a system 500 shown in FIG. 5 which includes the auxiliary booster pump 540. As noted above, system 500 provides regeneration and water injection into inlet of the compressor 110 and the discharge air provided by the compressor 110. Thus, the WAR cycle provided by the system 500 is a water-augmented Brayton cycle in which some portion of the compressor discharge air is heated prior to combustion by exhaust gases, which permits a decrease in the flow rate of fuel required to heat the compressed air to the desired turbine inlet temperature.

The purpose of this thermodynamic analysis was to obtain a preliminary estimate of potential heat rate improvements from the WAR cycle. Practicality and feasibility of implementation was not closely considered. However, the amount of air extracted from the shell was limited to maintain a reasonable pipe size.

Figure 6:
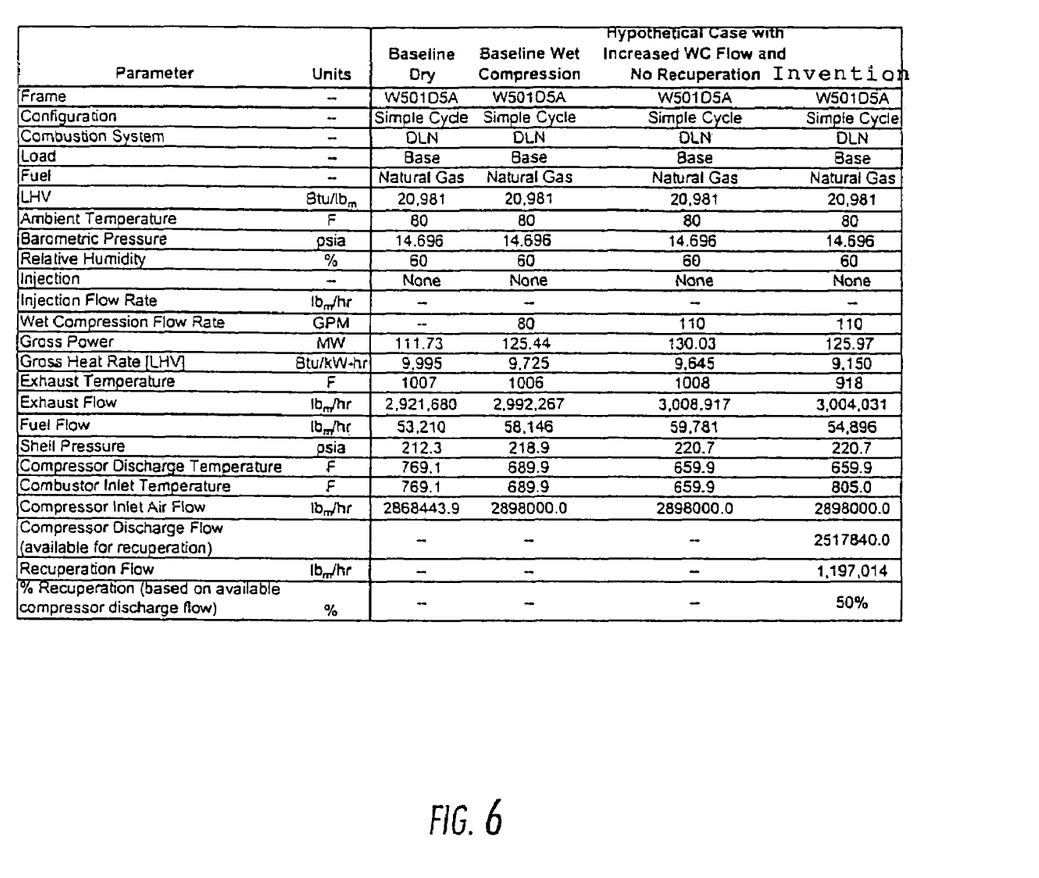
FIG. 6 is a data table showing calculation results for baseline dry, baseline wet compression, increased wet compression flow and no recuperation, and system 500 shown in FIG. 5 which includes both wet compression and recuperation.

A W501D5A frame (PLEASE DESCRIBE) was used for the analysis and a proprietary thermodynamic code was utilized to calculate baseline performance for the following conditions:

Base load
Simple cycle
DF42 combustors
Unheated natural gas: 98% $CH_4$, 0.6% $C_2H_6$, 1.4% $N_2$
No water or steam injection
80° F. ambient temperature
14.696 psia barometric pressure
60% relative humidity
Wet Compression Performance Calculation Proprietary methodology for calculating wet compression performance was utilized and applied to the baseline dry performance to calculate W501D5A performance with wet compression operation using system 500. The following assumptions were made:

Maximum WC flow limit=110 GPM
Baseline WC flow limit=80 GPM
Baseline and wet compression performance calculation results for baseline dry and baseline wet compression systems for comparison to the invention are included in FIG. 6.

WAR Cycle Analysis

For the WAR cycle analysis, it was assumed that the compressed air would be extracted from the combustor shell downstream of the RAC air extraction point. From the baseline wet compression analysis, it was calculated that 665.0 $lb_m$/sec was available for this purpose. Three different extraction rates were assumed for the WAR cycle analysis:

Case 1: 10%×665.0=66.5 lb$_m$/sec
Case 2: 25%×665.0=166.3 lb$_m$/sec
Case 3: 50%×665.0=332.5 lb$_m$/sec The following major assumptions were used in the analysis (refer to system 500 shown in FIG. 5 for point locations referred to below):

Pressure drop from point A to point B is 10 psi.
Isentropic efficiency of the booster pump 540 is $\eta_B$=90%.
Pressure drop from point C to point D is 5 psi.
Pressure drop from point D to point E (across heat exchanger) is 10 psi.
Heat exchanger effectiveness is $\epsilon$=0.8.
Pressure drop from point E to point F is 5 psi.
Warm air from the regenerator is thoroughly mixed with air directly from the compressor discharge before entering the combustion chamber.
For the combustor heat balance, it was assumed that no heat was lost to the surroundings (no "heat-up" of combustor shell air).
Energy added from combustion was assumed to be equal to $\dot{m}_{fuel}LHV'$, where $LHV'=LHV+h_{fuel}$.
Steady state is assumed everywhere.
All gases are assumed to be calorically perfect, i.e. enthalpy is a function only of temperature.
Gas mixture properties were evaluated using NASA Reference Publication 1311, June 1996. Datum for enthalpy evaluations was 400° R.

Pressure Booster Analysis

With the assumed pipe pressure losses, the required pressure ratio across the booster to bring the pressure at point F up to the shell pressure was $\Pi_B$=1.1424. Using this value and the assumed booster efficiency, the change in temperature across the booster was calculated as $\Delta T_B$=45.1° F. The booster power requirements ($P_B$) were then calculated for each case using the air flow rates:

Case 1: $P_B$=0.81 MW
Case 2: $P_B$=2.03 MW
Case 3: $P_B$=4.05 MW

Heat Exchanger Analysis

Given the assumed heat exchanger effectiveness of $\epsilon$=0.8 and the turbine exhaust temperature calculated for the baseline WC case, the temperature of the regeneration air downstream of the heat exchanger was calculated using the definition of heat exchanger effectiveness:

$$\varepsilon = \frac{(\dot{m}c_p)_{cold}\Delta T_{cold}}{(\dot{m}c_p)_{min}(T_{in,hot} - T_{in,cold})}$$

where $(\dot{m}c_p)_{min}=(\dot{m}c_p)_{cold}$, since the mass flow and the specific heat of the cold side (regeneration air) were both lower than for the hot side (exhaust gas). The downstream temperature was calculated to be $T_E$=947.2° F.

Mixing Junction Analysis

To determine the temperature and enthalpy of the air mixture just before entering the combustion chamber ($T_F$, $h_F$), a heat balance was calculated around a theoretical "black box" inside which the warmed regeneration air and the air directly from the compressor discharge were mixed.

Case 1: $T_F$=689.0° F.
Case 2: $T_F$=732.6° F.
Case 3: $T_F$=804.8° F.

Combustion Chamber Analysis

A simple heat balance was calculated around the combustion chamber to determine the fuel flow rate required to obtain the base load turbine inlet temperature of 2765° F. Since it was not attempted to use exactly the same method and assumptions employed by the proprietary thermodynamic code used, the simplified heat balance was also applied to the baseline WC case for comparison with regeneration cases 1–3. As a check, this simplified method was used to calculate the fuel flow rate for a simplified baseline WC case and was compared to the results of the baseline wet compression performance evaluation using the proprietary methodology. The difference was about 0.3%, which indicates that the simplified method is a reasonable approximation. In addition, it can be assumed that a significant portion of any errors introduced by the simplifying assumptions was cancelled out due to the comparative nature of this analysis. proprietary thermodynamic code, the simplified heat balance was also applied to the baseline The fuel mass flows calculated with the simplified heat balance around the combustion chamber were as follows:

Case 0 (simplified baseline WC): $\dot{m}_f$=58,327 lb$_m$/hr (compared to 58,146 lb$_m$/hr from WC calculations using proprietary methodology)
Case 1: $\dot{m}_f$=57,375 lb$_m$/hr (reduction of 1.63% from case 0)
Case 2: $\dot{m}_f$=55,947 lb$_m$/hr (reduction of 4.08% from case 0)
Case 3: $\dot{m}_f$=53,566 lb$_m$/hr (reduction of 8.16% from case 0)

Results

Heat rates were computed for cases 1–3 using the power output from the hypothetical case with increased WC flow and no recuperation shown in FIG. 6, minus the pressure booster power requirement, and the percentage reduction in fuel consumption calculated for each case. The computed heat rates for cases 1–3 were then compared to the baseline Wet Compression heat rate of 9725 Btu/kW-hr shown in FIG. 6. The following are the results obtained:

Case 1: HR=9530 Btu/kW-hr (reduction of 2.0% from baseline WC case)
Case 2: HR=9390 Btu/kW-hr (reduction of 3.4% from baseline WC case)
Case 3: HR=9150 Btu/kW-hr (reduction of 5.9% from baseline WC case)

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A gas turbine system having water augmented regeneration, comprising:

a compressor for receiving air and producing compressor discharge air, a combustor for combusting an oxygen comprising gas flow including said discharge air and a fuel into a hot gas flow, and a turbine expander generating output power from said hot gas flow and providing a hot exhaust gas flow;

an extractor for splitting said discharge air into a direct flow portion routed directly to said combustor and an indirect flow portion;

a mixing device for receiving said indirect flow portion and a water flow, said mixing device providing a water enhanced indirect flow portion, and a heat exchanger, said heat exchanger heating said water enhanced indirect flow portion using heat from at least a portion of said hot exhaust gas flow, wherein said water enhanced indirect flow portion after heating by said heat exchanger is reintroduced into said oxygen comprising gas flow, wherein said mixing device comprises a water or steam driven venturii ejector.

2. The system of claim 1, wherein said water flow is a steam flow.

3. A gas turbine system having water augmented regeneration, comprising:
 a compressor for receiving air and producing compressor discharge air, a combustor for combusting an oxygen comprising gas flow including said discharge air and a fuel into a hot gas flow, and a turbine expander generating output power from said hot gas flow and providing a hot exhaust gas flow;
 an extractor for splitting said discharge air into a direct flow portion routed directly to said combustor and an indirect flow portion;
 a mixing device for receiving said indirect flow portion and a water flow, said mixing device providing a water enhanced indirect flow portion,
 a heat exchanger, said heat exchanger heating said water enhanced indirect flow portion using heat from at least a portion of said hot exhaust gas flow, wherein said water enhanced indirect flow portion after heating by said heat exchanger is reintroduced into said oxygen compressor gas flow,
 a water pump, wherein said water pump is fluidly connected to an inlet of said compressor, said water pump injecting water into said inlet of said compressor, wherein said compressor provides wet compression, and
 heat exchanger disposed between said water pump and said mixing device for heating said water.

4. The system of claim 3, wherein said water flow is a steam flow.

5. A method of operating a gas turbine system including a compressor for receiving air and producing compressor discharge air a combustor for combusting an oxygen comprising gas flow including said discharge air and a fuel into a hot gas flow, and a turbine expander generating output power from said hot gas flow and providing a hot exhaust gas flow, comprising the step of;
 splitting said discharge air into a direct flow portion and an indirect flow portion; routing said direct flow portion directly to said combustor;
 mixing said indirect flow portion with a water flow to provide a water enhanced indirect flow portion;
 heating said water enhanced indirect flow portion using heat from at least a portion of said hot exhaust gas flow,
 reintroducing said water enhanced indirect flow portion after said heating into said oxygen comprising gas flow, and
 wherein said mixing step utilizes a water or steam driven venturii ejector.

6. A method of operating gas turbine system including a compressor for receiving air and producing compressor discharge air, a combustor for combusting an oxygen comprising gas flow including said discharge air and a fuel into a hot gas flow, and a turbine expander generating output power from said hot gas flow and providing a hot exhaust gas flow, comprising the steps of;
 splitting said discharge air into a direct flow portion and an indirect flow portion; routing said direct flow portion directly to said combustor;
 mixing said indirect flow portion with a water flow to provide a water enhanced indirect flow portion;
 heating said water enhanced indirect flow portion using heat from at least a portion of said hot exhaust gas flow,
 reintroducing said water enhanced indirect flow portion after said heating into said oxygen comprising gas flow, and
 injecting water droplets into an inlet of said compressor, wherein said compressor provides wet compression,
 wherein said mixing step utilizes a water or steam driven venturii ejector.

* * * * *